US010967306B2

(12) United States Patent
Hiat

(10) Patent No.: US 10,967,306 B2
(45) Date of Patent: Apr. 6, 2021

(54) CONTINUOUS FILTRATION WITH BACKFLUSH CLEARANCE OF ALTERNATE FILTERS

(71) Applicant: Boyle Energy Services & Technology, Inc., Concord, NH (US)

(72) Inventor: Judah Hiat, Albequerque, NM (US)

(73) Assignee: Boyle Energy Services & Technology, Inc., Merrimack, NH (US)

( * ) Notice: Subject to any disclaimer, the term of this patent is extended or adjusted under 35 U.S.C. 154(b) by 0 days.

(21) Appl. No.: 16/466,851

(22) PCT Filed: Dec. 29, 2017

(86) PCT No.: PCT/US2017/068942
§ 371 (c)(1),
(2) Date: Jun. 5, 2019

(87) PCT Pub. No.: WO2018/126125
PCT Pub. Date: Jul. 5, 2018

(65) Prior Publication Data
US 2019/0344202 A1 Nov. 14, 2019

Related U.S. Application Data

(60) Provisional application No. 62/440,059, filed on Dec. 29, 2016.

(51) Int. Cl.
*B01D 29/52* (2006.01)
*B01D 29/66* (2006.01)
(Continued)

(52) U.S. Cl.
CPC ............ *B01D 29/52* (2013.01); *B01D 29/66* (2013.01); *B01D 35/12* (2013.01); *B08B 9/032* (2013.01);
(Continued)

(58) Field of Classification Search
CPC ........ B01D 29/52; B01D 29/66; B01D 35/12; B08B 9/032; B08B 2230/01; F01K 9/026; F01K 11/02
See application file for complete search history.

(56) References Cited

U.S. PATENT DOCUMENTS 4,471,618 A * 9/1984 Tratz ..................... F22D 11/006
60/646
4,793,938 A 12/1988 Dayton
(Continued)

FOREIGN PATENT DOCUMENTS

JP 2005214123 A 8/2005

OTHER PUBLICATIONS

International Search Report and Written Opinion in corresponding International Application No. PCT/US2017/068942, dated Mar. 5, 2018; 9 pages.

*Primary Examiner* — Shafiq Mian
(74) *Attorney, Agent, or Firm* — Burns & Levinson LLP; Jerry Cohen

(57) ABSTRACT

Improved steamblow commissioning of a steam plant with continuous filtration of particle laden condensate through dual strainer filters with backflush means operatable in parallel to enable isolation of one and backflushing while the other is backflushed and venting backflushed particles to waste to enable an uninterrupted commissioning process recycling steam with significant particulate burden relived by continuous cycling in alteration through the dual filers and removal of particles to waste with backflush.

5 Claims, 3 Drawing Sheets

(51) Int. Cl.
*B01D 35/12* (2006.01)
*B08B 9/032* (2006.01)
*F01K 9/02* (2006.01)
*F01K 11/02* (2006.01)

(52) U.S. Cl.
CPC .............. *F01K 9/026* (2013.01); *F01K 11/02* (2013.01); *B08B 2230/01* (2013.01)

(56) References Cited

U.S. PATENT DOCUMENTS

| | | | |
|---|---|---|---|
| 9,901,849 B2* | 2/2018 | Pintar | B01D 29/56 |
| 2003/0015475 A1* | 1/2003 | Liebig | F01K 21/06 |
| | | | 210/698 |
| 2008/0236616 A1 | 10/2008 | Bloch | |
| 2015/0360151 A1* | 12/2015 | Pintar | B01J 8/0453 |
| | | | 210/805 |
| 2019/0210874 A1* | 7/2019 | Chandran | C01B 3/24 |

* cited by examiner

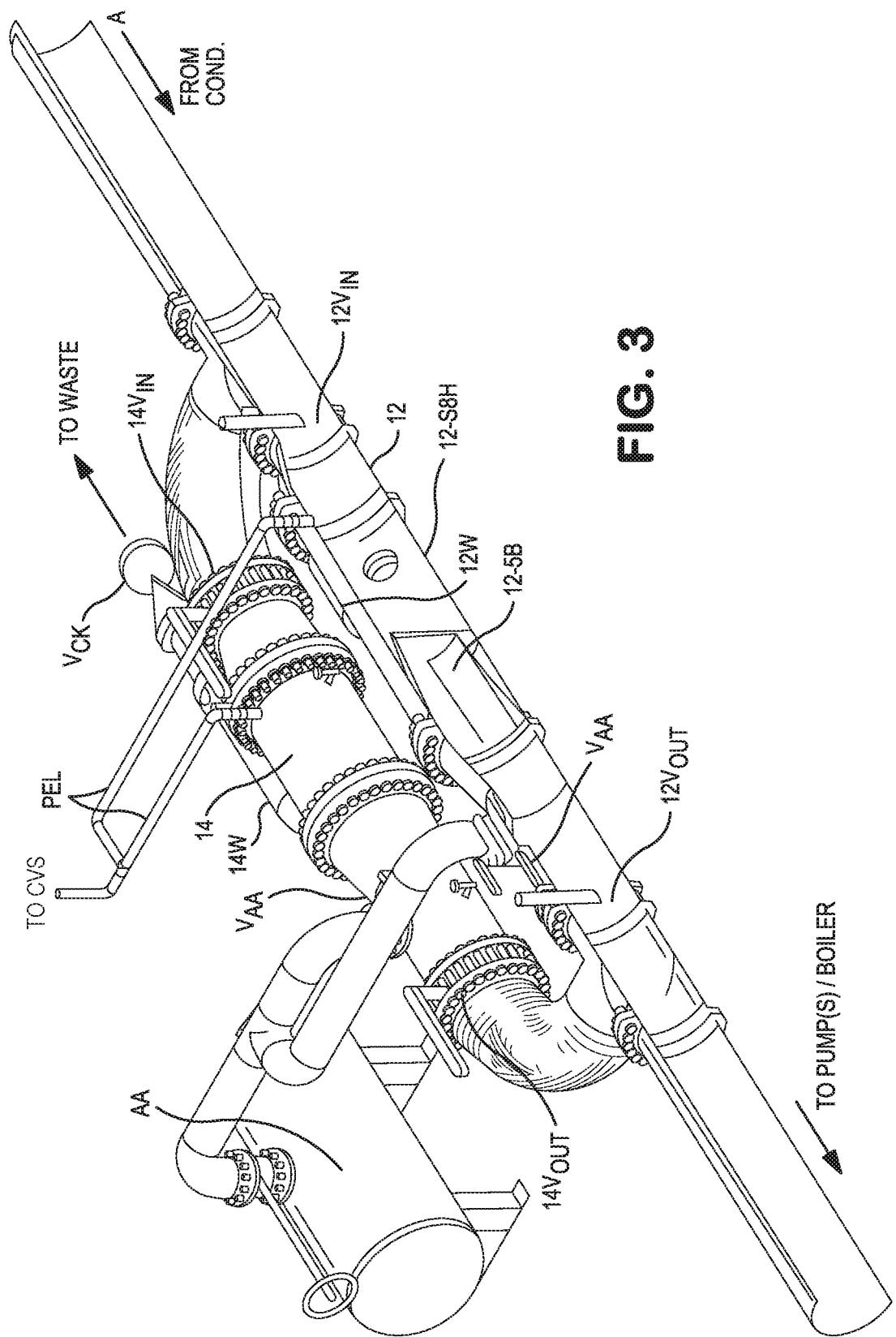

CONTINUOUS FILTRATION WITH BACKFLUSH CLEARANCE OF ALTERNATE FILTERS

CROSS REFERENCE TO RELATED APPLICATIONS

This application is a U.S. national stage entry under 35 U.S.C. 371 of co-pending International Application No. PCT/US2017/068942, file on Dec. 29, 2017, which in turn claims priority from U.S. Patent Application Ser. No. 62/440,059 file Dec. 29, 2016 entitled "Continuous Filtration with Backflush Clearance of Alternate Filters" which are incorporated by reference herein in their entirety and for all purposes.

FIELD AND BACKGROUND OF THE INVENTION

The present invention relates to the commissioning of new and refurbished steam generation plant equipment and piping.

The state of the art as of 2007-2008 is indicated in U.S. Pat. No. 9,217,566 issued Dec. 22, 2015 ('566 patent) of Christopher J. Bloch filed as Ser. No. 12/056,128 Mar. 26, 2008 with priority from provisional application 60/908,277 filed Mar. 26, 2007. It is assigned to the same assignee as the present assignee/applicant. The '566 patent's full contents are incorporated herein by reference as though fully stated herein. The invention(s) described in the '566 patent changed the pre-existing state of the art and led to a new method and apparatus provided to the art by its assignee, under its trademarks SIGMA™ and SIGMABLOW™, as a way of reducing time, labor, cost and external fuel and water resources costs of the power plant commissioning. The process improvement included features of integrating decontamination with other commissioning activities (e.g. tuning); removing both particulate and non-particulate contamination essentially at the same time; inclusion of all elements of the steam/condensate cycle in the commissioning; use of steam blow at high steam velocities to effect high cleaning force conditions and chemical treatment of non-particulate contaminants to enable removal. The '566 patent shows use of temporary equipment and piping to enable high temperature, high power operation of a stand-alone steam cycle or of combined cycles with steam cycle recovery and combined main cycle plant operating e.g. in combustion of petroleum base gases, methane or biofuel, or use of nuclear, wind-power, or geothermal sources.

SUMMARY OF THE INVENTION

Since the advent of the process and apparatus based on the '566 patent some needs and opportunities for further improvement remain. A significant modification is made through the present invention which deals with the condenser effluent which is particle laden with contaminants in an early stage of commissioning. After an initial stage of steamblow from a plant boiler passing through piping portions and venting to atmosphere, the steam is then routed to the plant condenser bypassing turbine components. The effluent from the condenser is cleaned quickly by a dual strainer (or other multiple of strainers) with rapid switching, among strainers, i.e., a given strainer being out of cycle operation for cleaning and quickly back into availability to process condensate without need for removal of that strainer for manual cleaning of the strainer or shut down or other interruption or adjustment of the commissioning. While that strainer is briefly out of service, another strainer is taking over the function of filtering/cleaning of the condensate. The cleaning in each filter is done by an improved rapid, back flushing with blasts of accumulated/stored gas (preferably air) and cycling between strainers is sufficiently rapid to provide continuous filtering despite heavy loading of each strainer for a substantial initial period. The effluent from the strainer is fed to a centrifugal pump for return to the plant boiler. After cleaning, steam is admitted to the full closed cycle power loop including turbine component(s) to run the full power cycle in normal (steady state) operation.

Other objects, features and advantages will be apparent from the following detailed description of preferred embodiments taken in conjunction with the accompanying drawings in which:

BRIEF DESCRIPTION OF THE DRAWINGS

FIG. 3 is an isometric view of the FIG. 1 system with one of its two conduits shown in partial section form;

DETAILED DESCRIPTION OF PREFERRED EMBODIMENTS

Figure 2:
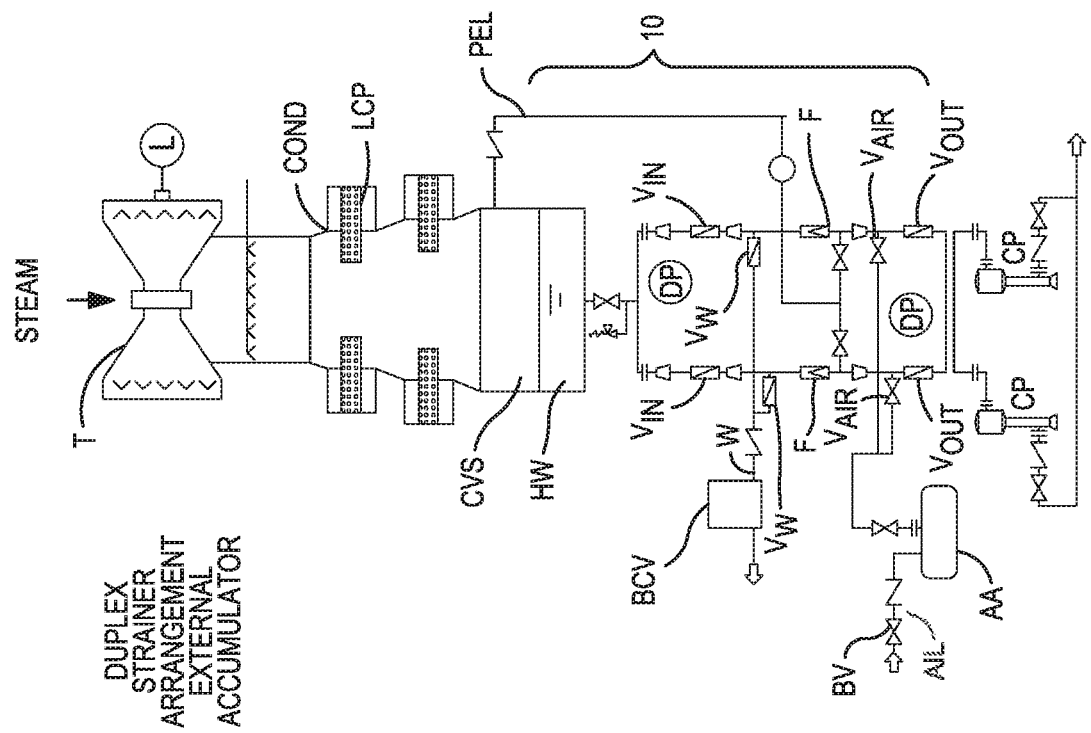
FIGS. 1 and 2 are schematics of a closed cycle low pressure (LP) steam generating plant including preferred embodiments of the multi-(dual) filter system in simplex (FIG. 1) and parallel (FIG. 2) arrangements.
Figure 1:
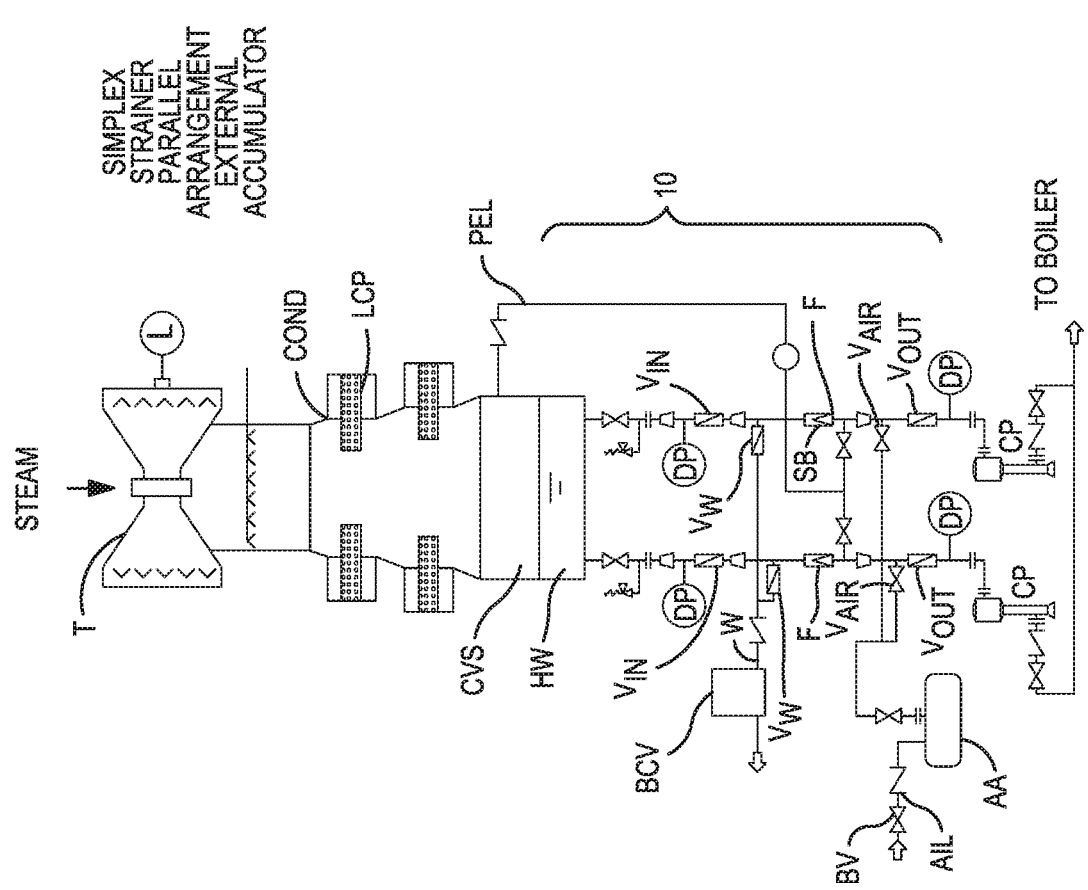

FIGS. 1 and 2 show schematically a preferred embodiment of the condensate filtration portion as a first aspect of the present invention in simplex parallel and duplex arrangements, respectively, placed in the condenser to boiler path of a closed cycle low pressure steam generation plant. The plant itself can operate stand-alone or as a heat recovery supplementary portion of a combined power cycle with one or more primary power cycles based on other sources of energy, (e.g. combustion gas, solar or wind power, geothermal otherwise). In a combined cycle, the steam cycle "boiler" may be a heat recovery steam generator reheating condensate to steam from primary cycle residual energy use of one of the above energy sources. In normal operation steam is admitted to the turbine T to drive a load (e.g. an electricity generator). Exhaust steam from the turbine is admitted to a condenser COND, which may be (a) of "surface cooled" form, i.e. with steam cooled on surfaces of liquid cooled pipes (LCPs) therein with circulation of liquid coolant therein or (b) of air cooled condenser types with steam passing through interiors of tubes and cooled by external air. The condenser has a condenser vapor space CVS therein (or in an adjunct condensate tank) and a hotwell HW therein containing liquid condensate that is recirculated to the boiler via one or more condensate pumps CP of permanent plant equipment. In many steam plant systems there is a need for commissioning for initial startups of plants or later startups after offline repairs deal with major particulate and nonparticulate contamination of plant piping and equipment introduction in original manufacturing or refurbishing of the plant. Some commissioning processes include "steam blow" methods and apparatus to cleanse plant piping and equipment. After an initial "trash blow" of steam through piping to waste (exhaust), steam is routed the air condenser and condensate is recycled to the boiler. An example of this is in the basic '566 Bloch patent cited above. Filters F are provided in-line between the condenser and condensate pumps that recirculate condensate to the boiler. Per the present invention, filters are preferably provided as fine mesh and truncated conical form strainer baskets, preferably in multiples e.g. two, in parallel so that one can be serviced offline while the other continues flow from the condenser to its condensate pump. See generally FIG. 2 and related text of the '566 patent. As shown in its FIG. 1 herein two conduits lead to entrances of two filters and two filter exits lead to separate condensate pumps CP. As shown in its FIG. 2 herein a common condensate outlet divides to feed filter conduits' inlets depending on open-closed states of inlet valves Vin and outlet valve Vout therein and to pass filtered liquid through a common exit to the condensate pumps, the feed path depending on open-closed status of the inlet and outlet valves. In either of the FIG. 1 or FIG. 2 systems embodiments of the '566 patent the valving preferably puts one or the other of the conduits with its filter in service at a time but in some instances both can be operational in parallel.

In both the embodiments of FIG. 1 and FIG. 2 herein an air accumulator tank or pipe AA is primed (changed) to a high pressure fill (typically 100-150 psig) by air from a plant air source and when enabled to do so (by opening a valve under manual control or automated response to a rise in differential pressure between inlet and outlet of a filter) admits air to the downstream (exit) side of one or the other of the filters via air lines V, usually just one at a time, to backflush the strainer basket filter to dislodge and drive off particulate material at the filter's upstream (inlet) side. The driving force to dislodge and remove the particles to waste is a turbulent air/liquid mixture that exits the conduit via a waste line W preferably with flow buffered in a backflush containment vessel BCV before release as waste. Differential pressure gauges DP are provided to indicate when an in-service filter is unduly fouled by particle loading leading to a pressure drop and this indication can be used automatically or manually to isolate the parallel conduit of the fouled filter and enable backflushing of it and bring the filter of the other conduit into service to maintain continuity of flow and filtration of flow from condenser to boiler via the condensate pumps. A pressure equalization line PEL with its own valving connects condenser vapor space CVS to one or the other of the conduits (to the one with backflushing in progress) at any given time.

Figure 4:
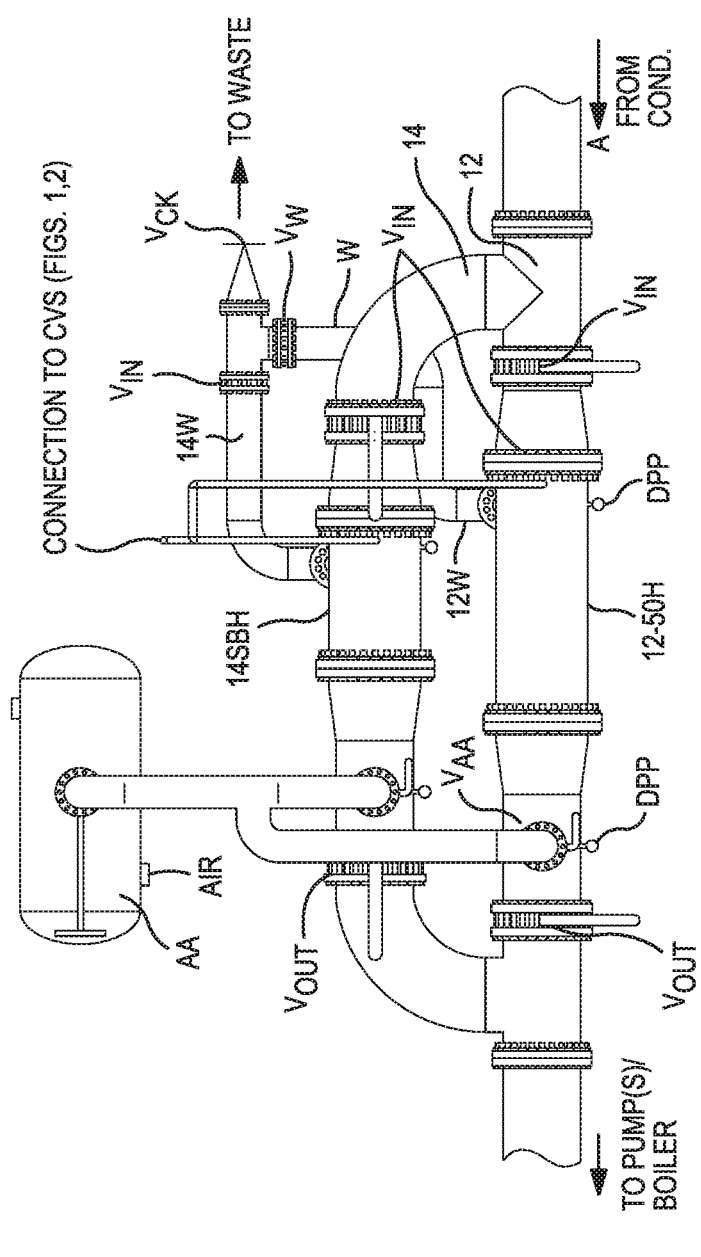
FIG. 4 is a top view of the FIG. 3 configuration.
Figure 5:
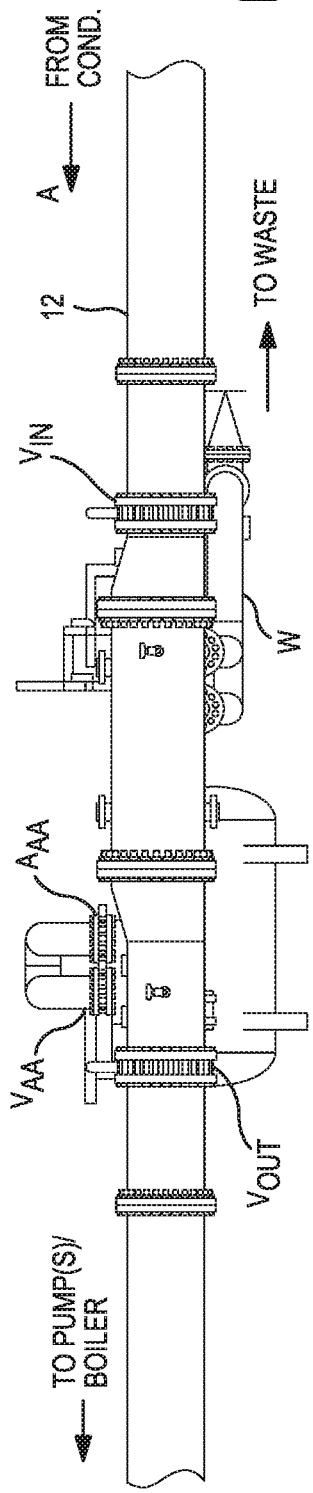
FIG. 5 is a side view of the FIG. 3 configuration.

FIG. 3 shows as an isometric view and FIGS. 4 and 5 show top and side views, with further detail, for either of the FIG. 1 or FIG. 2 embodiments with like reference letters to like components. The filters F (strainer baskets, SB) are contained in strainer basket housing pipe sections SBH inserted into the parallel conduits 12 and 14 connecting a boiler hotwell to condensate suction pumps and then to the boiler or other reheat component. The strainer basket housing pipe sections SBH are larger in diameter than the condenser outlet pipe(s) into which they are inserted to compensate for flow area restrictions of the strainer baskets SB therein. Preferably, the inlet and outlet valves 12 Vin/Vout and 14 Vin/Vout in the two parallel conduits are butterfly valves with arm extensions indicating open (arm in line) or closed (arm at 90° to in-line) status. Differential pressure ports DPP are shown for connecting differential pressure gauges to the conduits upstream/downstream of the filters therein. Waste lines are shown at W with their respective waste line valves Vex leading to a buffering containment vessel (BCV in FIGS. 1 and 2) and a shared check valve (Vck) leads to exhaust.

The FIG. 3 arrangement is an implementation of FIG. 1 or 2 and partially sectioned at the filter housing SBH of one of the parallel conduits 12 to reveal the strainer basket (mesh strainer) filter SB therein as being of conical form tapering down from outlet end to inlet end (i.e. particles entrained in condensate liquid contact the outside of the tapering cones) and air blown in from the air accumulator blows first to the inside of the tapering cone (downstream side) and through its mesh to dislodge particles and aggregates of particles coating the basket and move them to waste as an air/liquid flow carries the particles away. The waste line valve is then closed and inlet, then outlet valves are closed to allow refill of the SBH section and resumption of filtered flow through without significant air bubbles entrapped therein.

In FIGS. 1-5, it is seen that the first conduit 12 and a second conduit 14 have filters F1, F2 and more particularly have strainer basket housings 12SBH and 14SBH therein, respectively, including truncated conical strainer baskets 12SB and 14SB. The arrow A indicates the direction of inlet water (e.g. from the condenser hotwell of the system shown at FIG. 2 of the '566 patent and FIGS. 1 and 2 herein). Waste lines 12W and 14W connect to conduits 12 and 14, respectively. Air accumulator AA is connected to conduits 12 and 14 to selectively, under valve control, access their respective strainer basket housing sections 12SBH and 14SBH.

Strainer isolation valves (preferably butterfly valves) are provided for conduit 12 at 12Vin and 12Vout, for conduit 14 at 14Vin and 14Vout and for waste lines 12W and 14W in each waste line. The butterfly valves can be manually or power actuated (e.g. pneumatically actuated). When, e.g. the strainer basket 12SB filtering is impeded (fouled) by solids build up (on its water entry side), as indicated by a pressure drop across the strainer measured via differential pressure ports DPP (shown in FIGS. 1, 2, 4 and 5), the valves of conduit 12 can be operated to close to isolate that strainer and valves 14V-in and 14V-out of conduit 12 can be operated to open to let flow run through strainer basket 14SB. High pressure flow of air from intake of air accumulator 12AA opens to blow the strainer 12SB clear creating a mixture of air and turbulent liquid with fouling matter then driven out through waste line 12W via valve Vw and an exhaust valve i.e. a check valve Vck. The waste lines and lines from the accumulator means to the strainer basket housings have diameters of a significant size in relation to strainer basket housing diameters, preferably over 20% and in some usages significantly higher. The backflushing and related valve operations can be accomplished in seconds.

An air inlet port AIP is provided to recharge the exhausted air accumulator after each backflush usage and a water inlet port WIP to recharge each conduit with water after its backflushing operation is complete. A level-sighting glass is provided for each conduit.

Differential pressure gauges (DP) (shown in FIGS. 1, 2) are applied to conduits 12 and 14 via pressure ports indicated at DPP. When the differential pressure gauge for a conduit shows a change in pressure drop on the strainer in that conduit above a set point, it signals the isolation valves for that conduit to close and its waste line valve to open and for the applicable air entry line from the air accumulator AA to open after the strainer basket filter is isolated. The ports are threaded and installed both upstream and downstream of each strainer basket in order to connect differential pressure gauges therebetween. Differential pressure across the strainer basket must be monitored during operation. As the strainer fouls, differential pressure across the strainer increases, which if unresolved, leads to excessive differential pressure that can result in pump cavitation or structural failure of the strainer basket. Sight glasses are attached to the conduits in order to provide a visual indication to the operator that a flush was successful (water level decreases out of sight glass range) and when refilling of the clean strainer is complete the water level increases to visibility in a sight glass range.

The system is preferably self-regulating with switched usage/backflushing between conduits 12 and 14 determined by fouling of its respective strainer basket rather than fixed time intervals of switching but in some systems, a series of fixed time intervals can be employed. The monitoring and valve operation and backflush can be manually controlled or automated.

Water inlet lines WIL are provided on edges of backflushed conduits and air inlet lines AIL with air inlet ports AIP for recharging the air accumulator under ball valve control (BV). The air lines include a connection to a vapor space in a water source tank (not shown) that feeds the water line.

The open area totals for a basket (SB) of each mesh strainer, add up, preferably, to 150% or more flow area of the conduit 12 or 14 in which it is contained.

The strainer mesh should have hole sizes equal to or smaller than the hole sizes on the boiler feed pump suction strainers. This insures that contaminants won't be passed through the condensate pumps which could then foul the boiler feed pump strainers. Typical power plant jobs use a mesh size of 80-100 mesh. The strainer should point upstream (the truncated point of the cone towards the condenser). The strainer mesh must be on the outside of the strainer cone. The strainer should be manufactured with the cone made from perforated plate, the mesh outside the cone, and a second very coarse retaining mesh to restrain the fine mesh during flushing. Under no circumstances should fine mesh be attached to the inside of the cone, since mesh failure could result in catastrophic pump damage in this configuration.

The vent line should be about 2" for most applications to allow for rapid refilling of the strainers after flushing. The vent line must be routed so that it is downhill from the condenser vapor space to the strainer, with no pockets. This configuration allows the line to drain back to the strainer, without forming liquid seals which would defeat the function of the vent line. The vent line should have a glass-type flow indicator so the operator is aware when the strainer is refilled with water. The flow area of the air connection to the receiver and the waste line should be greater than 10% of the flow area of the strainer housing. This will insure adequate flushing velocities. The waste line should be as short as practical to avoid excessive line losses. The waste line should be routed to a sump to contain the splash when backflushing. If a suitable sump is not available, then the line can be routed to a muzzler type froth slug catcher.

The waste line will be subject to high dynamic loads. It must be adequately supported to resist these loads. The design of the supports also must not impose excessive pipe stresses on the condensate pump suctions, particularly in thermal cases when the lines heat up. The design of the waste piping should be reviewed by a competent stress analyst.

The valves to control the strainer can be manually actuated or automatic. Air and waste valves will typically be automated if they are greater than 6". Automated air valves should have an interlock in the control panel that prevents opening the air valve unless the strainer isolation valves are closed. This is to prevent the accidental discharge of air into the suction of an operating pump.

The air tank has a secondary block valve which should be closed except when the backflush system is in active use. This secondary block helps to avoid air leakage into the pump suctions. The volume of the air tank should be at least 50% of the volume of the suction piping/strainer assembly which it will be evacuating. The nozzle size of the receiver should provide a flow area greater than 10% of the strainer housing flow area. The flow nozzle can be combined with an inspection manway through the use of an adapter piece. Flexible hoses should be avoided in the air side of the system. If flexible hoses are used, the safety protocols developed for froth flushing should be used.

A valve must exist between the air receiver and the hose. A length of hard piping with a length 1.5 times the flex hose should be installed downstream of the valve, and before the flexible hose. The isolation valve should be closed except when the system is in active use, i.e. a pressurized flexible hose should not be left unattended for extended periods of time.

Each strainer has a differential pressure gauge across it which will indicate strainer fouling. Suction strainers are structurally designed for greater than 10 psi, preferably equal to or greater than 20 psi. These are preferred limits but some systems may be designed for lower or higher ranges. Upper limits depend on practical cost, conductivity and sizing considerations of thickness, porosity and weight. Strainer differential pressure are maintained below the applicable lower limit to avoid a structural failure of the strainer assembly. Net pressure suction head (NPSH) must also be maintained on the suction side of the condensate pumps at all times to prevent cavitation of the pumps.

The strainer system should be equipped with tapping points so the permanent plant differential pressure transmitters can be connected. All automatically controlled pumps are set to trip for high differential pressure and low condensate pump NPSH should be utilized. Auto start logic should be disabled since the pump suctions will not be in their permanent configuration.

The system should be equipped with a small pressure sensing valve (PSV) between the downstream isolation valve and the pump. This pressure sensitive valve prevents over-pressurization of the strainer assembly and the expansion joint in the event of leakage of the discharge check valve in standing-by pump. If a permanent PSV with this function exists, it should be temporarily relocated to the temporary piping.

The components of the strainer system should be standardized and flanged to the greatest degree possible to facilitate reuse of the components on multiple projects. This dual strainer feature with rapid cyclic backflushing can be used in systems with surface condensers and air cooled condensers. But air cooled condensers used are preferably pre-rinsed in advance of in-line usage in commissioning to prevent an excessive load of contamination from overwhelming the filter system.

The above described system is one that is temporarily installed for commissioning and used for managing liquid flows with high loading of particulate contaminants at one or more stages of commissioning operation, enabling switching of first and second conduits/strainer baskets without stoppage of flow and avoidance of conduit section removal, manual cleaning steps and shut down dangers.

A further attribute of the present invention is that it is capable of functioning in a low or negative pressure applications with high burden of particulate matter in flowing liquid and less costly compared to known self-cleaning strainer assemblies used in many industrial processes, including low suction head operations, such as are shown at http://www.tekleen.com. However, in the above described significant steam plant usage of the present invention, simple strainers can be used on the condensate pumps as backups to filtration provided continuously and reliably by the present invention.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

The invention claimed is:

1. In a steamblow commissioning system for steam cycle power plants with boiler, turbine, condenser with interconnection piping means in a dosed cycle with high pressure steam rooted to the condenser via permanent piping wherein the commissioning includes use of steam blow means to capture particles and routing the steam to the condenser and recycling condensate from the condenser to the boiler, a process of improvement comprising:
continuous flushing and removal of waste particle laden condensate from the condenser;
filtering using a first filter and a second filter, and operating the first filter and the second filter in alternation, operating the first filter until a selected level of particulate burden is reached, then switching the first filter off line, and
switching on to the second filter to engage in filtering particle laden condensate;
back-flushing the first filter by an air blast of accumulated air; and
interchanging roles of the first and the second filters repeatedly without interrupting condenser outflow and transit to the boiler until goal of uninterrupted commissioning is achieved.

2. An apparatus to implement the process of improvement for the steam blow commissioning according to claim 1, the apparatus comprising:
means constructed and arranged for continuous flushing of particle laden condensate from the condenser;
(a) a first filter and a second filter having truncated conical basket form pointing upstream in respective housings operating in alternation, the first filter operating until a selected level of particulate burden is reached, then
(b) the first filter going offline, and the second filter is engaged for filtering particle laden condensate=the first filter is back-flushed by an air blast of accumulated air, and alternatively switching roles of the first and the second filters,
(c) means for measuring pressure drops between inlet and exit sides of each filter housing to establish a trigger point for back-flushing
(d) alternating backflush repeatedly and without interrupting flow of particle laden condensate from the condenser to multi-filter means or from said first filter and said second filter to the boiler, the first and second filters operating in alternation until goal of uninterrupted commissioning is achieved.

3. The apparatus of claim 2 wherein the first and second filters comprise mesh strainers of truncated conical form overlaid on expanded metal and within the respective housings having inlet and exit ends with the conical form converging toward the inlet end,
each of the first and the second filter housings having valving means upstream and downstream of the first and second filters, and
further comprising a common air accumulator connected to the downstream of each the first and the second filter housings via valving controllable to selectively blow air through the interior of each strainer forcing particles on the conical strainer through its mesh surface, and
further comprising waste lines means with valving connected to inlet ends of the filter housings to enable removal of particles blown from the conical strainer.

4. The apparatus of claim 3 further comprising means for re-charging the air accumulator after each strainer backflush operation.

5. The apparatus of claim 3 further comprising a pressure equalization line with valving to selectively connect the first and the second filter housings to a vapor space of the condenser.

* * * * *